United States Patent [19]

Dawson

[11] Patent Number: 4,504,075
[45] Date of Patent: Mar. 12, 1985

[54] TOWABLE TRANSPORT CARRIER FOR MOTORCYCLES AND THE LIKE

[76] Inventor: Dennis E. Dawson, 2716 Fleur Dr., Apt. #1, Des Moines, Iowa 50321

[21] Appl. No.: 506,809

[22] Filed: Jun. 22, 1983

[51] Int. Cl.³ .............................................. B60P 3/06
[52] U.S. Cl. .................... 280/402; 280/408; 280/411 C; 280/423 A; 280/476 R
[58] Field of Search ............... 280/402, 408, 411 R, 280/411 C, 423 A, 476 R, 475, 479 R, 415 R

[56] References Cited

U.S. PATENT DOCUMENTS

| 2,496,515 | 2/1950 | Bayes | 280/423 A |
| 2,570,482 | 10/1951 | Pruitt | 280/476 R |
| 3,428,335 | 2/1969 | Clark | 280/479 R |
| 3,610,661 | 10/1971 | Pierce et al. | 280/415 R |
| 3,912,098 | 10/1975 | Nicotra | 280/402 X |
| 3,919,831 | 11/1975 | Halls et al. | 280/415 R |
| 4,426,096 | 1/1984 | Rodrigues et al. | 280/411 C |

*Primary Examiner*—John A. Pekar
*Attorney, Agent, or Firm*—Morton S. Adler

[57] ABSTRACT

A carrier having special utility for transporting recreational vehicles such as motorcycles, bicycles and snowmobiles is designed to be used either as an independent towable trailer or, with or without such vehicles carried thereon, to be removably coupled to a towable travel trailer. This carrier includes a V frame structure having a hitch ball coupling at the apex for detachable connection to a towing vehicle and opposed wheel assemblies capable of quick and easy adjustment to be either in or out of ground engagement or, if desired, completely removed when not required. The diverging members of the carrier frame are designed to embrace and be detachably secured to a conventional tongue with a hitch ball coupling on a travel trailer, and a hitch ball is suitably mounted intermediate the diverging members of the carrier frame for registration with the standard hitch ball coupling on the trailer tongue. The wheels are in ground engagement when the carrier is not attached to a travel trailer and when it is attached to such a trailer, the wheels can be selectively placed out of ground engagement or completely removed. The carrier includes a support rack for articles to be transported and a loading ramp for the same movable to and from a loading position.

11 Claims, 11 Drawing Figures

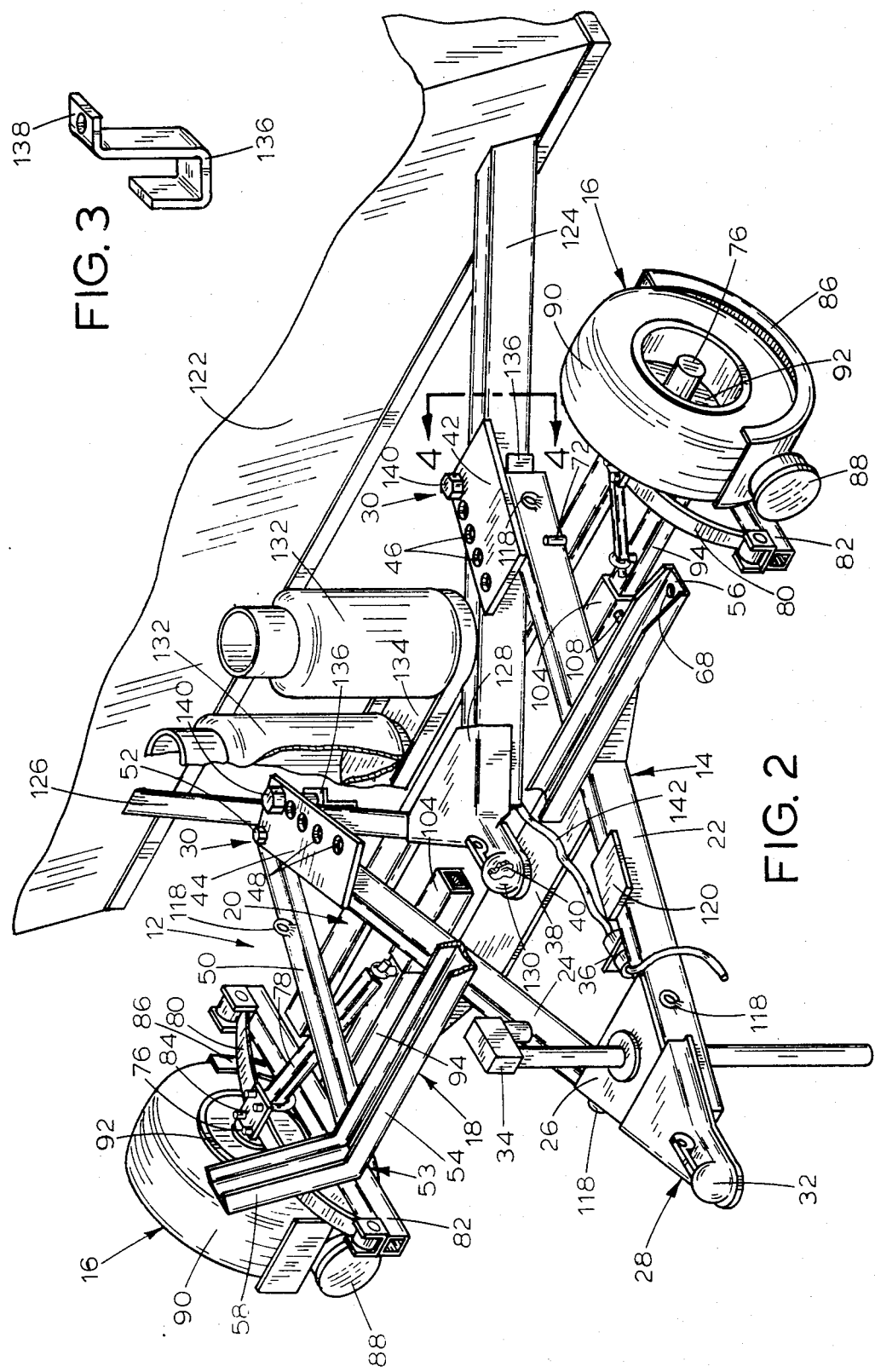

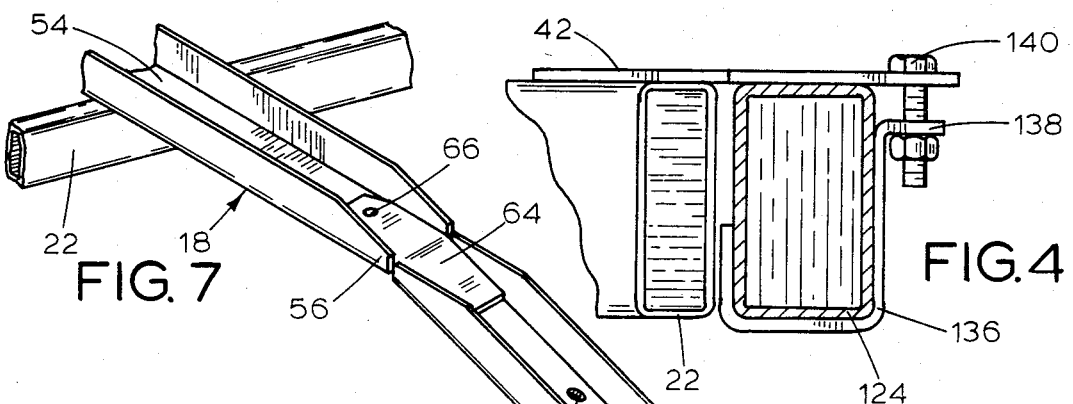
FIG. 7
FIG. 4
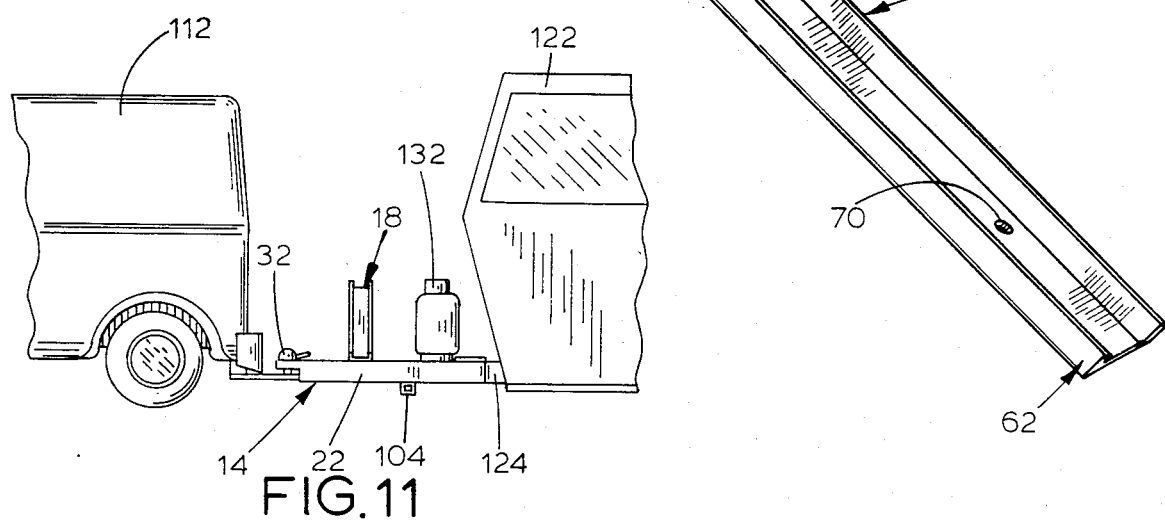
FIG. 11
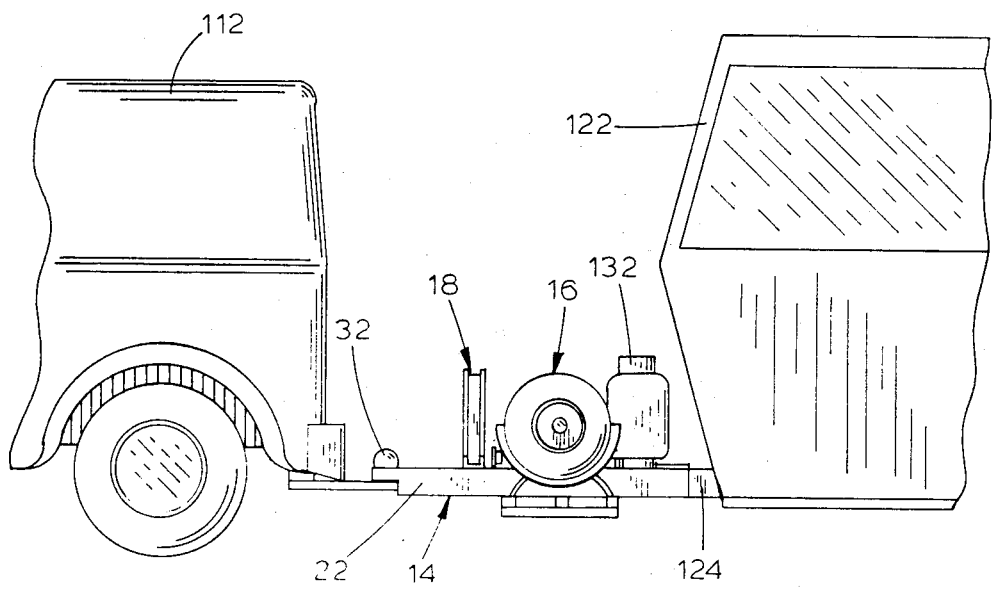
FIG. 10

TOWABLE TRANSPORT CARRIER FOR MOTORCYCLES AND THE LIKE

BACKGROUND OF THE INVENTION

This invention relates to improvements in a transport carrier for such articles as motorcycles, bicycles, snowmobiles and the like and more particularly to such a carrier capable of service either as an independent trailer or for coupling to a towable travel trailer or the like.

Notwithstanding that recreational vehicles of various types such as motorcycles, bicycles and snowmobiles are capable of being ridden or driven from place to place, this is not always practicable nor desirable and it is a common and widespread practice for owners and users of such equipment to transport them to and from places of intended use particularly when the desired environment of use such as snow covered or hilly terrain may be long distances from the usual storage area of such vehicles. For such purposes, various carrier means are used which generally include special purpose trailers, truck beds or direct attachment in a variety of ways to a car, van, truck or towed travel trailer.

The term, travel trailer, as used herein refers to that type of a trailerable substantial recreational vehicle providing sleeping, eating and bathroom facilities for the user and while not normally convenient or practicable for transporting recreational vehicles such as motorcycles, bicycles, snowmobiles and the like, are nevertheless used for such purposes by one means or another.

When travel trailers are towed and carry cycles or the like secured to the rear, the top or otherwise as is increasing in popularity, it is frequently the case that after reaching a selected destination for parking the trailer, it is necessary to further transport the recreational equipment to the actual site for use to which further towing of the travel trailer is neither desired nor convenient and at times, not possible. While such trailers are relatively mobile, they have some obvious limitations and disadvantages due to size for movement off of main traveled roads and thus for the most part, are generally parked at suitable sites equipped to service the needs of the users for electricity, water, sewer, etc., as is well known. In these situations, such equipment must be ridden or driven to the place of use, if possible, or arrangements must be made for transportation of the same by some means other than the travel trailer and such arrangements are not always readily available.

With the above observations in mind, it is one of the important objects of this invention to provide a wheeled transport carrier for recreational vehicles such as motorcycles, bicycles, snowmobiles and the like that is designed to be used either as an independent towable trailer behind a towing vehicle and, with or without such vehicles carried thereon, to be capable of being coupled to a travel trailer for towing the same.

Another object of this invention is to provide a transport carrier of the above class that can be simply, easily and quickly coupled to or decoupled from a travel trailer.

A further object here is to provide the carrier with an adjustable wheel assembly selectively movable into and out of ground engagement or easily and quickly completely removed when not required.

Still another object herein is to provide a transport carrier as characterized which includes a stored loading ramp that can be easily and quickly arranged for facilitating the loading of vehicles from ground level to the carrier.

The foregoing objects and such further objects as may appear herein, or be hereinafter pointed out, together with the advantages of this invention will be more fully discussed and developed in the more detailed description of the accompanying drawings.

BRIEF DESCRIPTION OF THE DRAWINGS

FIG. 2 is a perspective view of this transport carrier shown coupled to the fragmentary forward end of a conventional travel trailer for towing the same and with the carrier wheels moved to a non-ground engaging position, FIG. 3 is a perspective view of a clamp used for securing the carrier to the travel trailer, FIG. 4 is an enlarged elevational view taken from the line 4—4 of FIG. 2 showing the use of the clamp in FIG. 3, FIG. 7 is a fragmentary perspective view showing the loading ramp in operable position relative to the support rack on the carrier, FIG. 10 is a schematic view showing the carrier in FIG. 2 relative to a towing vehicle and coupled to a travel trailer with the carrier wheels out of ground engagement, and FIG. 11 is a view similar to FIG. 9 but with the carrier wheels completely removed.

DESCRIPTION OF THE PREFERRED EMBODIMENTS

Figure 1:
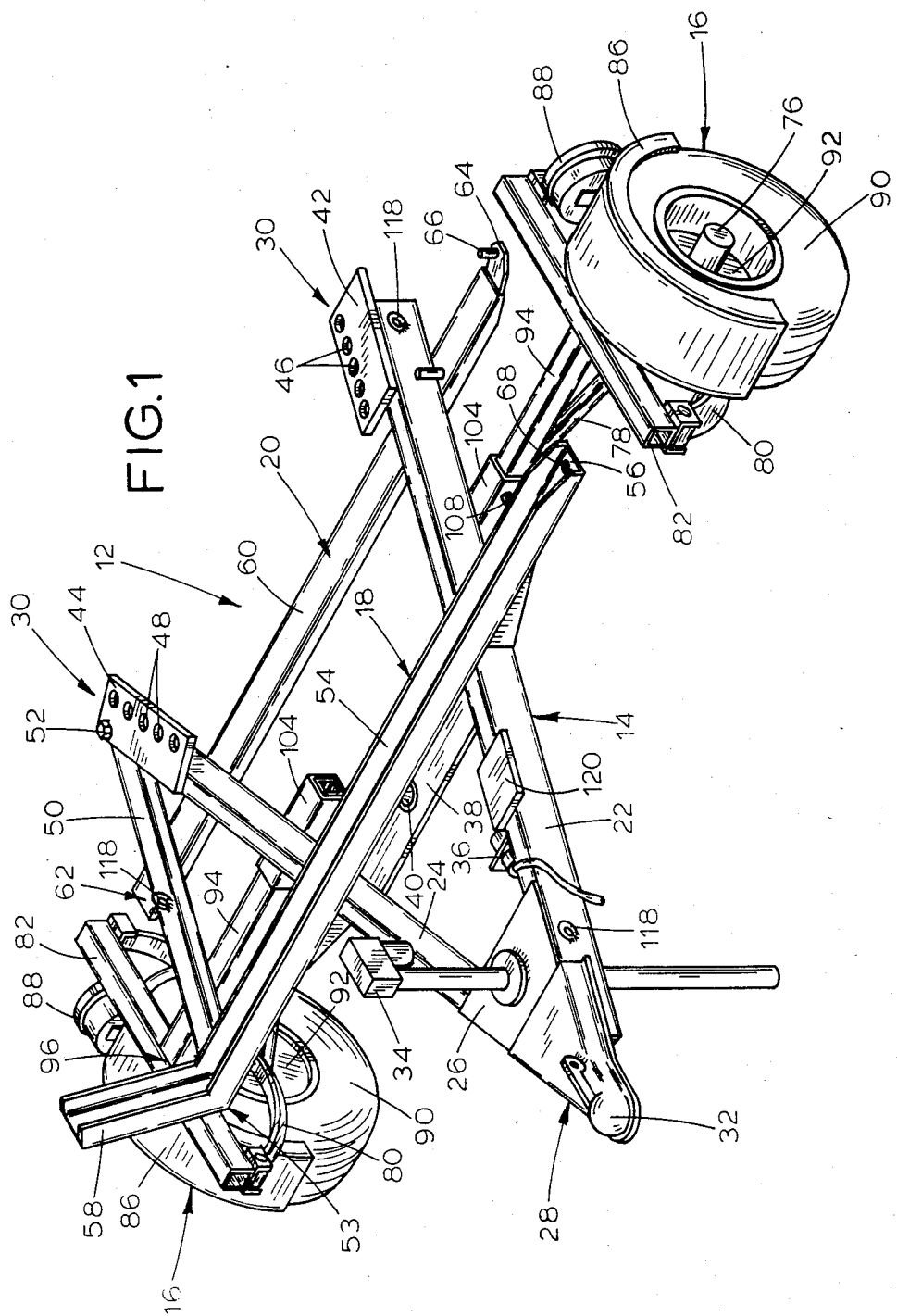
FIG. 1 is a perspective view of this transport carrier as an independent towable trailer with the wheels in ground engaging position.

Referring to the drawings, this new carrier is designated generally by the number 12 as best seen in FIG. 1 and includes generally a frame 14, oppositely disposed wheel assemblies 16, a vehicle support rack or rail 18 and a removable storable loading ramp 20 which will all be referred to in more detail.

Frame 14 comprises two elongated rigid beams 22, 24 suitably secured together at corresponding ends and reinforced by gusset 26 to form a front apex end 28 and diverging therefrom to terminate in spaced relationship at the rear ends 30. A conventional hitch ball coupling 32, a commonly used jack leg unit 34 and electrical connection means 36 are mounted to the forward carrier end 28. Such parts so far described are common in trailer construction and I have applied the following improvements thereto for accomplishing the objects of this invention.

A crossbeam or bar 38 is secured to the undersides of beams 22, 24 approximately midway between frame ends 28, 30 and carries an upstanding hitch ball 40. At the rear ends 30 of beams 22, 24 there is fixedly secured, preferably by welding, the flat rectangular mounting plates 42, 44 which are in juxtaposition to the top surface of said beams and project perpendicularly inwardly from the respective inner sides thereof for a distance equal to or slightly greater than the beam widths as best seen in FIG. 1. The projecting portions of each plate 42, 44 are respectively provided with a plurality of longitudinally spaced aligned holes 46, 48. A rigid elongated brace 50 is secured at one end to end 30 of beam 24 by a bolt means 52 through the outer rear corner portion of plate 44 and the other end extends forwardly and outwardly from end 30 to a point forwardly of crossbeam 38 where it serves to support one end of rail 18 as at 53.

Rail 18 comprises an elongated channel 54 open at the loading end 56 and provided at the opposite end with the upwardly inclined channel extension stop means 58. Such rail is disposed transversely of beams 22, 24 slightly forwardly of crossbeam 38 and is preferably removably anchored to beams 22, 24 and the forward end of brace 50 at 53 by suitable bolt and nut means (not shown). Rail 18 as shown and described is designed for a single motorcycle or bicycle and it will be understood that more than one such rail support can be used if desired or that a support of a different configuration for other types of vehicles can be employed without departing from the principles and objects herein disclosed.

Figure 8:
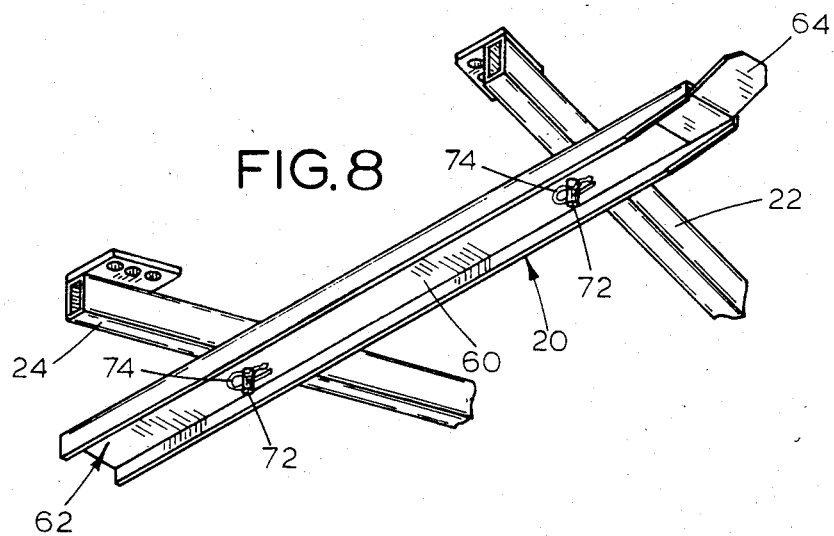
FIG. 8 is a perspective view from the underside of the carrier frame showing the storage position of the loading ramp.

The loading ramp 20 is provided to facilitate placing machines too heavy to lift onto rail 18. This ramp is an elongated channel member 60 similar to rail channel 54 with the open ground engaging end 62 and the angled tongue 64 at the opposite end for nesting in the loading end 56 of rail 18 where a pin 66 depending from tongue 64 registers with a hole 68 at end 56 of rail 18 as best seen in FIG. 7. During transport, ramp 20 is removably stored transversely of beams 22, 24 on the underside thereof (FIG. 1) and for such purpose, channel portion 60 is provided with a pair of spaced holes 70 to register with respective grooved pins 72 depending from beams 22, 24 to be secured by clips 74 in a well known manner as seen in FIG. 8.

Wheel assemblies 16 as seen in FIG. 1 are separate units of like construction as distinguished from the usual trailer arrangement where opposed wheel assemblies are mounted to opposite ends of a common axle, and like numerals are given to like parts in the following description with reference more particularly to FIGS. 2,5.

A hub (FIG. 2) 76 is rotatably journalled on the spindle end of a stub axle 78 by suitable bearings in a conventional manner for which no invention is claimed per se and is thus not shown in detail. Also, a leaf spring 80 is suitably mounted to a spring support bar 82 and shackled 84 to axle 78 all in a well known manner. A fender 86 and light unit 88 attached to bar 82 together with a tired wheel 90 mounted on the rim 92 of hub 76 are also standard components which are well known.

Figure 5:
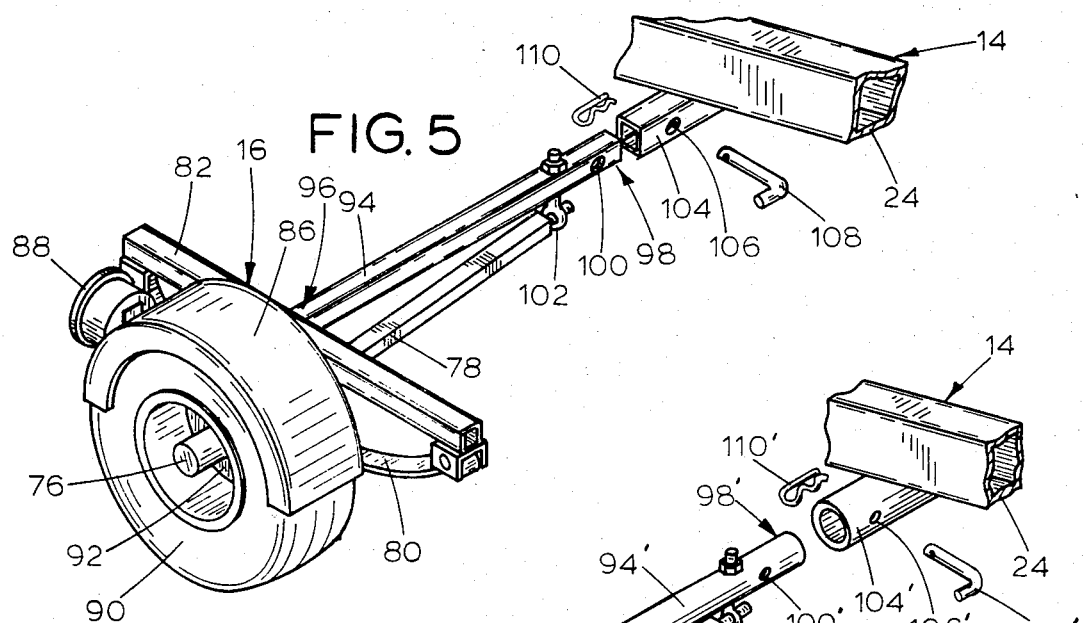
FIG. 5 is a perspective view of the wheel assembly on the carrier in position for attachment to the carrier frame.
Figure 6:
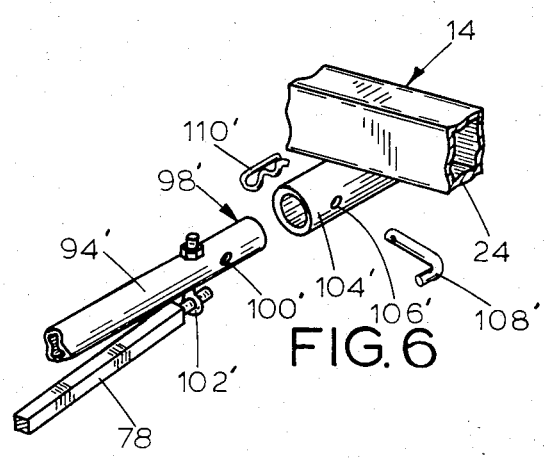
FIG. 6 is a perspective view of a second embodiment of portions of the wheel assembly seen in FIG. 5 relating to the use of round tube material for the square tubing in FIG. 5.

An elongated mount member 94 is fixedly secured at end 96 to the longitudinal midpoint of bar 82 so as to extend inwardly as seen in FIG. 5 to end 98 which is provided with the transverse hole 100. Member 94 is longer than axle 78, in vertically spaced longitudinal alignment therewith and the free end of axle 78 is secured to mount 94 inwardly from hole 100 by a suitable fastening means 102. Respective opposed aligned sleeves 104 (FIG. 1) are fixedly secured to the underside of the beams 22,24 transversely of the longitudinal axes thereof just rearwardly of crossbeam 38 and the end of such sleeves extending outwardly from the beams are provided with the transverse hole 106. By this arrangement, the free end of mount 94 can be slip-fitted into sleeve 104 so that holes 100 in 94 and 106 in 104 are in registration and mount 94 can be releasably secured to sleeve 104 by means of a fastening pin 108 and clip 110 through holes 100, 106. When wheel assembly 16 is thus mounted as described and with axle 78 below the mount member 94 as seen in FIG. 5, the tires 90 will be in ground engagement and when mount member 94 is mounted to sleeve 104 so that axle 78 is above such mount member 94 as seen in FIG. 2 and further illustrated in FIG. 10, tires 90 are out of ground engagement but secured to frame 14. In this regard, it is noted that mount member 94 and sleeve 104 as shown in FIG. 5 are square tubes so that changing the wheel assembly 16 from ground engaging position to non ground engaging position is accomplished by removing clip 110 and pin 108, withdrawing member 94 from sleeve 104, rotating member 94 one hundred eighty degrees and reinserting it in sleeve 104 for reattachment by pin 108 and clip 110. As an alternative to the necessity for complete removal of member 94 from sleeve 104, reference is made to FIG. 6 where mount member 94 and sleeve 104 may be in the form of respective round tubes identified as 94' and 104' so that the change in the wheel position can be accomplished merely by rotating member 94' within sleeve 104'. Other parts in FIG. 6 are given like numerals primed for like parts in FIG. 5.

Figure 9:
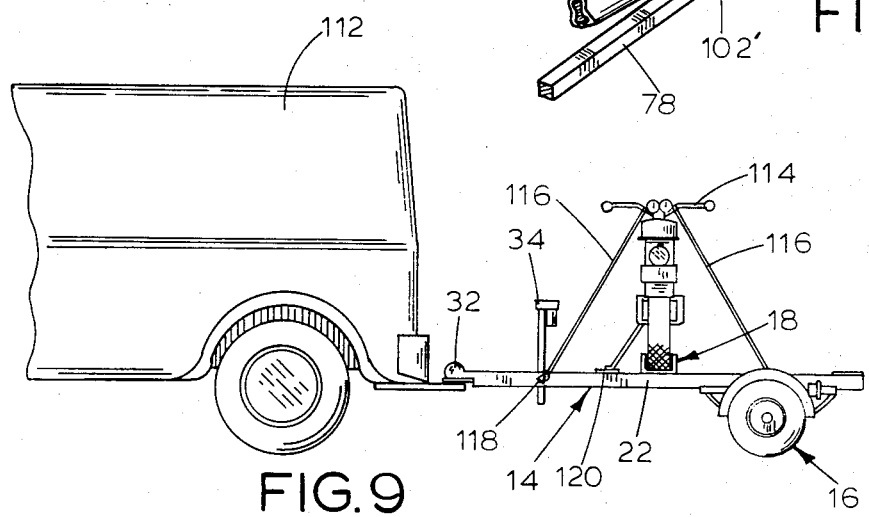
FIG. 9 is a schematic view showing the carrier in FIG. 1 attached to a towing vehicle and carrying a cycle secured with tie down straps.

Thus far described, carrier 12 is represented in FIG. 1 as an independent trailer unit adapted to have coupling 32 hitched to a towing vehicle 112 as seen in FIG. 9. Also illustrated in FIG. 9 is a motorcycle 114 mounted in rail 18 by means of using ramp 20 seen in FIG. 7. Cycle 114 will be positioned with the front wheel abutting stop portion 58 of rail 18 and is preferably secured by a plurality of tie down ropes 116 extending from the cycle to suitably placed tie down rings 118 on frame 14. A plate 120 on beam 24 forwardly of rail 18 serves to support the kick stand on the cycle in a well known manner. It will also be understood that lights 88 will be appropriately wired and that the electrical means 36 is connected to the towing vehicle in a well known manner.

The particular advantage of carrier 12 as described and one of the important features thereof is its capability to not only independently carry various equipment but without losing this capability to also serve as a coupling or hitch means for towing a conventional travel trailer of any desired size. For this purpose, reference is now made more particularly to FIGS. 2,4 and to the schematic illustration in FIGS. 10, 11.

As seen in FIG. 2, a travel trailer is represented by a fragmentary front portion thereof 122 to which there is attached a conventional tongue assembly comprising the respective spaced frame members 124, 126 converging from the trailer 122 to a gusset plate 128 to which there is attached a well known hitch ball coupling 130 normally designed for attachment to a towing vehicle such as 112. The bottle gas containers 132 on supports 134 between beams 124, 126 are standard accessories for travel trailers and are shown for illustration only.

To attach carrier 12 to travel trailer 122, the carrier wheel assemblies 16 will be in ground engagement as seen in FIG. 1 so that the carrier can be moved in any suitable way toward the tongue assembly on the trailer to bring coupling 130 into registration with the hitch ball 40 on the carrier cross-beam 38 for coupling engagement in a conventional manner as seen in FIG. 2. In this position, ends 30 of carrier frame beams 22, 24 will be sufficiently close to the respective outer sides of trailer beams 124, 126 so that plates 42, 44 on beams 22, 24 will overlap respectively the beams 124, 126 and project inwardly to a point where a line through at least one of the holes 46 will not be obstructed, the plurality of such holes 46 being provided to accommodate variations in tongue angles on different trailers encountered.

For securing frame beams 22, 24 to the trailer beams 124, 126, I provide a rigid J shaped clamp 136 which includes the outwardly extending apertured lip 138 at the top as seen in FIG. 3. Thus with the relative position of frame beams 22, 24 to trailer beams 124, 126 as seen in FIG. 4, the lower arcuate portion of clamp 136 embraces the bottom of the trailer beam so that the lip portion 138 is in closely spaced parallel relationship to an extended portion of a respective plate 42, 44 which includes one of the holes 46 and such plate and lip are secured by the bolt and nut means 140. With carrier 12 thus attached to trailer 122, the wheel assemblies can be either moved out of ground engagement as described and as seen in FIGS. 2, 10 or, if desired, can be completely removed as illustrated in FIG. 11 if separate use of carrier 12 is not intended on any particular occasion. Repositioning of the wheel assembly is facilitated by using the jack leg 34 in a well known manner to elevate the coupled frame and tongue sufficiently for handling the wheel assemblies.

It will be appreciated from the foregoing that carrier 12 serves not only as an independent trailer behind a towing vehicle for transporting articles of various types not only in normal road travel but to off the road sites and without losing such capability can also function as a means for coupling to a conventional travel trailer for towing the same. Accordingly, in view of the foregoing, it is thought a full understanding of the construction and operation of this invention will be had and the advantages of the same will be appreciated.

I claim:

1. A towable transport carrier for motorcycles and the like, comprising:
    a wheeled frame having a leading end and a trailing end,
    coupling means on said leading end for hitchable connection to a towing vehicle,
    a support member for a motorcycle or the like mounted on said frame,
    means on said trailing end for selective removable attachment to another towable vehicle of a type provided with a hitch coupling means,
    hitch means on said frame for coupling engagement with the hitch coupling means on said other towable vehicle,
    said other towable vehicle being of a type provided with a tongue assembly for carrying the hitch coupling means,
    said wheeled frame comprising a pair of secured beams spaced apart at said trailing end and adapted at said end to embrace the tongue assembly of said other towable vehicle,
    respective rigid plate members on each beam at the trailing end and projecting laterally therefrom to overlap an embraced portion of said tongue assembly,
    a respective rigid clamp member engageable with a respective portion of said tongue assembly, and
    respective fastening means to removably secure said plate members at the overlapping portion to said clamp.

2. A towable transport carrier as defined in claim 1, including:
    an elongated loading ramp having one end adapted for removable operable communication with said support member and the other end adapted for ground engagement, and
    means for removably securing said loading ramp to said frame out of ground engagement during transport.

3. A towable transport carrier as defined in claim 1 wherein
    said hitch means on said frame is a conventional hitch ball.

4. A towable transport carrier as defined in claim 1 wherein said wheeled frame includes:
    a first and second like wheel assembly each including a road engaging wheel operably journalled on a stub axle and a mount means removably secured to said stub axle,
    said wheel assemblies being oppositely disposed relative to said frame intermediate the leading and trailing ends thereof,
    respective opposed mount support members on said frame,
    each mount means removably securable in a respective mount support member in one position of orientation to place the respective wheels in ground engagement, and
    each mount means removably securable in a respective mount support member in another selective position of orientation to place the respective wheels out of ground engagement.

5. A towable transport carrier as defined in claim 4, including:
    an elongated loading ramp having one end adapted for removable operable communication with said support member and the other end adapted for ground engagement, and
    means for removably securing said loading ramp to said frame out of ground engagement during transport.

6. A towable transport carrier as defined in claim 1, including:
    a crossbeam on said frame near said trailing end, and
    said hitch means on said frame being a conventional hitch ball disposed on said crossbeam in position for coupling engagement with the hitch coupling means on said other towable vehicle.

7. A towable transport carrier for motorcycles and the like, comprising:
    a frame having opposed sides, a leading end and a trailing end,
    coupling means on said leading end for hitchable connection to a towing vehicle,
    a first and second like wheel assembly each including a road engaging wheel operably journalled on a stub axle and an elongated mount means removably secured to said stub axle in vertically spaced longitudinal alignment therewith,
    said wheel assemblies being oppositely disposed relative to said frame sides intermediate said leading and trailing ends,
    respective opposed mount support sleeve members on said respective opposed sides of said frame, each mount means telescopically insertable into a respective mount support sleeve member in one position with said axle below said mount means to place the respective wheels in ground engagement, each mount means telescopically insertable into a respective mount support sleeve member in another selective position with said axle above said mount means to place the respective wheels out of ground engagement, respective fastening means for removably securing said mount means to said mount support sleeve members in selected positions, means on said trailing end for selective removable attachment to another towable vehicle of a type provided with a hitch coupling means, hitch means on said frame for coupling engagement with the hitch coupling means on said other towable vehicle, said other towable vehicle being of a type provided with a tongue assembly for carrying the hitch coupling means, said opposed frame sides at said trailing end adapted to embrace the tongue assembly of said other towable vehicle, respective rigid plate members on each frame side at the trailing end projecting laterally therefrom to overlap an embraced portion of said tongue assembly, a respective rigid clamp member engageable with respective portions of said tongue assembly embraced by said opposed frame sides, and fastening means to removably secure said plate members at the overlapping portions to said clamp.

8. A towable transport carrier as defined in claim 7, including:
said elongated mount means and said mount support sleeve members being square tubing, and
said elongated mount members being selectively insertable into said mount support sleeve members in different positions of orientation to place said wheels into and out of ground engagement.

9. A towable transport carrier as defined in claim 7, including:
said elongated mount means and said mount support sleeve members being of round tubing, and
said elongated mount members being rotatable within said mount support sleeve members to place said wheels into and out of ground engagement.

10. A towable transport carrier as defined in claim 7, including:
a support member for a motorcycle or the like mounted on said frame,
an elongated loading ramp having one end adapted for removable operable communication with said support member and the other end adapted for ground engagement, and
means for removably securing said loading ramp to said frame out of ground engagement during transport.

11. A towable transport carrier as defined in claim 7, including:
a crossbeam secured between opposed sides of said frame near said trailing end, and
said hitch means on said frame being a conventional hitch ball disposed on said crossbeam for coupling engagement with the hitch coupling means on said other towable vehicle.

* * * * *